ically significance, or with a functional derivative or metallic compound

UNITED STATES PATENT OFFICE 2,433,449

CONDENSATION PRODUCTS AND PROCESS OF PREPARING THE SAME

Charles Graenacher, Riehen, Richard Sallmann, Bottmingen, and Otto Albrecht, Basel, Switzerland, assignors to Society of Chemical Industry in Basle, Basel, Switzerland No Drawing. Application October 31, 1938, Serial No. 238,084. In Switzerland November 5, 1937

18 Claims. (Cl. 260—295)

This invention relates to the manufacture of valuable condensation products of the general formula

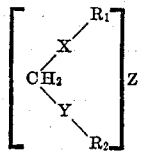

wherein $R_1$ and $R_2$ represent organic residues, X and Y represent an oxygen atom, if desired in the form of a

bridge, a sulfur atom or an $$-\underset{R_3}{N}-$$

bridge ($R_3$=hydrogen or, if desired, a substituted hydrocarbon residue) if desired in the form of a member of an amide-like residue and Z represents a group determining or enhancing the solubility of the product, this group being united with one of the residues $R_1$ and $R_2$ in such a manner that the number of the carbon atoms between Z and the oxygen, or sulfur, or nitrogen atom, respectively, of the nearest bridges indicated with X and Y amounts to at least 2 and wherein at least one of the two bridges X and Y is an oxygen atom, if desired in the form of

bridge, by causing a methylol compound of the general formula $R_1$—X—$CH_2$—OH, wherein $R_1$ and X have the aforesaid significance and wherein the sum of the carbon atoms contained in $R_1$ and if desired in X amounts to at least 2, or a functional derivative thereof to react with a compound of the general formula H—Y—$R_2$, wherein Y and $R_2$ have the aforesaid significance, or with a functional derivative or metallic compound thereof, to produce products of the general formula $R_1$—X—$CH_2$—Y—$R_2$, wherein at least one of the two bridges X and Y is an oxygen atom, if desired in the form of a

bridge and before or during or after the reaction introducing a group which determines or enhances the water solubility of the product into one of the residues $R_1$ and $R_2$ by known methods in such a manner that the number of the carbon atoms between the group determining or enhancing the water solubility and the oxygen, or sulfur, or nitrogen atom, respectively, of the nearest bridges indicated with X and Y amounts to at least 2.

As methylol compounds of the aforesaid general formula $R_1$—X—$CH_2$—OH wherein $R_1$ and X have the aforesaid significance there may be used, for example, methylol compounds of such carboxylic acid amides, amines or mercaptans which contain at least two carbon atoms. Among the functional derivatives of methylol compounds of the last named formula there may be named, for example, α-chloromethyl ether, chloromethylcarboxylic acid esters, α-chloromethyl-thioether, N-chloromethylcarboxylic acid amides. The organic residue $R_1$ of the last-named formula may be of high molecular weight, for instance an aliphatic, aliphatic-aromatic or cycloaliphatic residue of high molecular weight. The organic residue $R_1$ may also contain a group determining or enhancing the water solubility of the product, for instance a sulfonic acid, thiosulfuric acid, sulfuric acid ester, phosphoric acid ester or carboxylic acid group in free or neutralized form or a polyglycol ether residue; furthermore, an amino or an imino-group converted into the form of salt, for example a thiourea residue or an onium-group, for instance quaternary ammonium-, phosphonium- or ternary sulfoniumgroup; provided that the second component H—Y—$R_2$ indicated above for taking part in the reaction or the functional derivative or metal compound thereof does not have a group that lends solubility in water in residue $R_2$. Amino and imino groups for instance in the form of thio-urea radicals, as well as quaternary ammonium groups, are hereinafter called groups containing at least one basic nitrogen atom.

The organic residue $R_1$ of the aforesaid formula $R_1$—X—$CH_2$—OH may also contain a substituent which allows the introduction of a group which determines or enhances water solubility of the product, for example a halogen atom or a hydroxy-group. Such a substituent is hereinafter called a reactive substituent.

As carboxylic acid methylolamides there may be used, for example, the methylolamides of acetic, propionic, valerianic, lauric, myristic, palmitic, stearic, oleic or benzoic acid or of resin acids and naphthenic acids; methylolamides of chloro- or bromacetic acid or α-bromolauric acid; methylolamides which contain a group lending solubility in water, for example N-methylolsulfoacetamide, N-methylolsulfobenzamide, the quaternary addition product of pyridine and N-methylolchloracetamide. These N - methylolcarboxylic acid amides, so far as they are not known, are easily accessible by methods analogous to those that are known.

As methylol compounds of amines especially those may be used which are derived from secondary amines. Among the methylol compounds of mercaptans there may be named, for example, the hydroxymethylthioethers derived from thioglycollic acid amides.

The α-halogenmethyl ethers which are used in the invention may be derived from aliphatic, cycloaliphatic or aliphatic-aromatic alcohols or phenols containing at least two carbon atoms and which may contain aliphatic or cycloaliphatic residues of high molecular weight, such as ethyl, amyl, octyl, dodecyl, cetyl, octadecyl, alcohols, oleic alcohol, methylcyclohexanol, benzyl alcohol, alkylated phenols, polyhydric alcohols which are partially etherified or esterified, for instance glycerol ethers, also alkanolamines acylated at the nitrogen atom by fatty acid residues of high molecular weight or similar hydroxy-compounds. Such α-halogen ethers are, for example, the α-chloromethyl ethers obtainable from the aforesaid hydroxy-compounds and an equimolecular proportion of para-formaldehyde by introduction of hydrogen chloride in the usual manner, preferably at a low temperature and, if desired, in the presence of a solvent, for instance benzene. Also α-halogenmethyl ethers from halogen alcohols, for example ethylene-chlorhydrin-α-chloromethyl ether come into question. As examples of α-halogenmethyl ethers which contain a group determining or enhancing the water-solubility of the product there may be named chloromethoxyethyl pyridinium chloride or the α-chloromethylether obtainable in the usual manner from glycollic acid or hydroxyethanesulfonic acid by means of formaldehyde and hydrochloric acid.

As halogenmethyl carboxylic acid esters there may be used in the invention, for instance, the chloromethyl ester of lauric, stearic, acetic, chloracetic, α-bromolauric, hexahydro-benzoic acid, benzoic acid or sulfoacetic acid. These chloromethyl esters, so far as they have not been described, are obtainable by the known processes for making chloromethyl esters of fatty acids of low molecular weight or chloroacetic acid.

The above named α-halogenmethyl ethers and chloromethyl carboxylic acid esters may be described as halogen methyl compounds of the general formula $R_1$—O—$CH_2$—hal, wherein $R_1$ represents an organic radical containing at least two carbon atoms and hal stands for a halogen atom such as chlorine, bromine or iodine.

As α-halogenmethyl thioethers there may be used in the invention the α-halogenmethyl sulfides easily obtainable in known manner from mercaptans such as lauryl mercaptan, octadecyl mercaptan, β-chlorethyl mercaptan by means of formaldehyde and hydrogen halide.

As compounds of the general formula H—Y—$R_2$, wherein Y and $R_2$ have the foregoing significance, there may be cited alcohols, phenols, carboxylic acids, mercaptans, amines and carboxylic acid amides which contain at least two carbon atoms. The functional derivatives of compounds of this formula include carboxylic halides and anhydrides. Metal compounds of the general formula H—Y—$R_2$ are, for instance, the metal compounds of the alcohols, mercaptans, carboxylic acid amides, as well as the salts of carboxylic acids. The organic residue $R_2$ of this general formula may be of high molecular weight and may contain a residue of an aliphatic, aliphatic-aromatic or cycloaliphatic residue of high molecular weight. In the organic residue $R_2$ there may be contained also one of the aforesaid groups that determine or enhance the water-solubility of the product, provided that the reaction component of the formula $R_1$—X—$CH_2$—OH already more exactly described, or its functional derivative, does not provide groups lending water-solubility. The organic residue $R_2$ of the general formula H—Y—$R_2$ may also contain a substituent which permits the introduction of a group that determines or enhances the water-solubility of the product, for instance, a halogen atom or a hydroxy-group.

Alcohols suitable for the invention are, for example, amyl, lauryl, myristyl, cetyl, octadecyl or benzyl alcohol, resin alcohols, naphthenic alcohols, glycol, polyglycol, glycerol, polyglycerol, mannitol, mono- or polysaccharides. As examples of alcohols having a group lending solubility in water may be named hydroxy ethyl pyridinium chloride and hydroxyethane sulfonic acid. A substituent capable of conversion into a group lending solubility in water is, for example, contained in ethylenechlorhydrin.

As phenols there may be used, for example, those of the type of mesitol.

As carboxylic acids there may be used for the invention, for instance, aliphatic, cycloaliphatic or aromatic carboxylic acids, which contain at least two carbon atoms, for example undecylenic lauric, palmitic, stearic or oleic acid, resin acids, naphthenic acids, chloracetic-, dichloracetic, α-bromo-lauric-, chloromethylbenzoic-, chloromethylsalicylic, glycollic or lactic acid, as well as salts of any of these. Sodium and potassium salts are hereinafter called salts of an alkali metal the atomic weight of which amounts to at most 40. There also come into question aliphatic-, cycloaliphatic or aromatic acids containing tertiary alkylamino-groups, for instance, 4-dialkylamino-1-benzoic acids. Among carboxylic acids which contain besides at least one carboxyl group a group determining or enhancing water-solubility may be named polycarboxylic acids, for instance adipic acid, phthalic acid, naphthalic acid, benzene-1:3:5-tricarboxylic acid, benzenehexacarboxylic acid, also sulfocarboxylic acids, for instance sulfoacetic acid, sulfochloracetic acid, sulfosuccinic acid, 3-sulfobenzoic acid, 4-sulfophthalic acid, 3-sulfonaphthalic acid. Among functional derivatives of carboxylic acids are their halides, anhydrides and esters, for instance stearic acid chloride, phthalic anhydride, 3-sulfobenzoyl chloride, 4-sulfophthalic anhydride. In the sulfocarboxylic acids both the sulfo-group and the carboxyl group or only the sulfo-group or only the carboxyl group may have the form of a halide. There are also suitable, however, sulfocarboxylic acids of which the sulfo-group is esterified and the carboxyl group is present as an acid halide.

As mercaptans may be cited, for instance, lauryl mercaptan, octadecyl mercaptan, thioglycollic acid esters and amides, for instance thioglycollic acid anilide, thioglycollic acid octadecyl ester, also mono-thioglycerol, mercapto-ethanesulfonic acid as well as metal compounds thereof.

As amines there may be used, for example, primary and secondary amines of the aliphatic or mixed aliphatic-aromatic, aromatic, cycloaliphatic or heterocyclic series which contain at least two carbon atoms, for instance dodecylamine, methyloctadecylamine, N-hexadecylaniline, naphthylamines; also amines corresponding with the resin acids and naphthenic acids.

As carboxylic acid amides there may be used those derived from the above-mentioned carboxylic acids which may contain a group lending solubility in water or a substituent like a halogen atom or a hydroxy-group. Thus, for instance, stearic acid amide, stearic acid-N-methylamide, stearic acid anilide and stearic acid-ortho-toluidide may be cited. These amides are examples of such carboxylic acid amides which contain at least one free hydrogen atom connected with the nitrogen atom of the carboxylic acid amide group.

The above named alcohols, phenols, carboxylic acids, carboxylic acid amides, mercaptans and amines as well as their sodium and potassium compounds, for instance sodium and potassium salts of carboxylic acids, may be represented by the general formula A—Y—R$_2$, wherein A stands for a monovalent, cations forming element, the atomic weight of which amounts to at most 40, i. e. hydrogen, sodium and potassium, Y stands for a link containing an element of the fifth and sixth group of the periodic system of the elements the atomic weight of which amounts to at most 32 and is practically an even number, which element connects directly the methylene group —CH$_2$— with the radical R$_2$, i. e. an —O—, —NR— or —S— link, R$_3$ being hydrogen or a substituted or unsubstituted hydrocarbon radical, and wherein R$_2$ stands for an organic radical containing at least 2 carbon atoms indicated above in connection with the radical R$_2$ of the above named general formula H—Y—R$_2$.

The reaction between the methylol-compound of the aforesaid general formula

R$_1$—X—CH$_2$—OH or its functional derivative with the compound of the aforesaid general formula H—Y—R$_2$ or its functional derivative or its metal compound to produce the product of the aforesaid general formula R$_1$—X—CH$_2$—Y—R$_2$, in which at least one of the two bridges X and Y is an oxygen atom, if desired in the form of a

bridge, may be brought about by intermixing the components at room temperature or at a higher temperature, for example 50–100° C., if desired in the presence of a solvent, for instance acetone, dioxane, chloroform, carbon tetrachloride or benzene.

Thus, for example, products of the aforesaid general formula R$_1$—X—CH$_2$—OH, wherein R$_1$ is an organic residue and X an

bridge, in the form of a member of an amidelike residue, particularly a carboxylic acid methylolamide may be acylated, preferably in the presence of a tertiary base with compounds of the aforesaid formula H—Y—R$_2$, wherein Y is an oxygen atom in the form of a

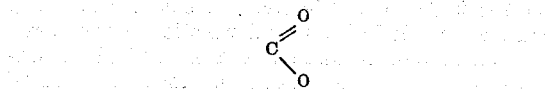

bridge and R$_2$ is an organic residue, particularly a carboxylic acid best in the form of its functional derivative, for instance a carboxylic acid halide or anhydride.

As a further example of this reaction may be named the reaction of a functional derivative of a compound of the aforesaid general formula R$_1$—X—CH$_2$—OH, wherein R$_1$ is an organic residue and X an oxygen atom or a

bridge, particularly of an α-halogenmethylether or a chloromethyl ester, with a compound of the aforesaid general formula H—Y—R$_2$, wherein Y is an oxygen atom, if desired in the form of its

bridge or a sulfur atom or an NR$_3$-bridge, if desired in the form of a member of an amide-like residue, particularly with an alcohol, a mercaptan, an amide or with a metal compound, especially a carboxylic acid salt, which reaction may be conducted at 20–40° C. or 90–100° C. When using compounds of the general formula H—Y—R$_2$ the treatment or heating with the halogenmethyl-compound is continued until elimination of hydrogen halide ceases.

As further examples of the reaction between functional derivatives of compounds of the aforesaid general formula R$_1$—X—CH$_2$—OH with compounds of the aforesaid formula H—Y—R$_2$ may be cited the reactions of α-chloromethylthioethers or N-chloromethyl-carboxylic acid amides with alcohols or carboxylic acid salts, which reaction may occur at 20–100° C.

One of the groups that lend solubility in water may be introduced into one of the residues R$_1$ or R$_2$ of the compound of the aforesaid general formula R$_1$—X—CH$_2$—Y—R$_2$ by known methods before, during or after the synthesis of the product of the last named formula.

By the introduction of a group lending solubility in water occurring before the synthesis of the product of the last-named formula is to be understood the selection of a reaction component for the condensation (a compound of the aforesaid general formula R$_1$—X—CH$_2$—OH or a functional derivative thereof or a compound of the general formula H—Y—R$_2$ or a functional derivative or metal compound thereof) which already contains a group determining or enhancing the water-solubility of the product. Numerous components for this reaction have already been cited which contain such a group. The reaction of such components may occur in the manner already indicated.

Simultaneously with the synthesis of the products of the aforesaid general formula

R$_1$—X—CH$_2$—Y—R$_2$ there may be introduced a group that determines or enhances the water-solubility of the product into one of the residues R$_1$ or R$_2$, if there is used, for example, one of the reaction components described in the last preceding paragraph which contains a reactive halogen atom and the reaction is conducted in the presence of a tertiary amine. Such halogenated reaction components have before been named. For example, halogen-carboxylic acid methylolamides may be acylated in the presence of tertiary amines, for instance trimethylamine, triethanolamine, dimethylaniline, dimethylcyclohexylamine, pyridine, hexamethylenetetramine, whereby quaternary ammonium compounds are produced.

After the product of the general formula $R_1-X-CH_2-Y-R_2$ has been synthesized, a group determining or enhancing the solubility in water may be introduced into one of the two residues $R_1$ and $R_2$ by converting a reactive substituent in either residue $R_1$ or residue $R_2$, for instance a halogen atom, a hydroxy-group or an amino-group into a group that determines or enhances the solubility of the product in water. Numerous reaction components have hereinbefore been adduced from which such products of the last-named formula, in which either $R_1$ or $R_2$ contains a reactive constituent may be obtained. A reactive halogen may for instance be converted by addition of a tertiary amine into a group lending solubility in water, for example a quaternary ammonium group. Such an addition may be secured, for example, at room temperature or at a raised temperature, if desired in the presence of a solvent. One can also cause a reaction product containing at least one reactive halogen atom to react with sodium thiosulfate or another thiosulfate or with sodium sulfite at room temperature or at a raised temperature, if desired in the presence of a solvent, for instance water, alcohol, acetone or a mixture thereof. It may be of advantage in these reactions to use catalysts, for instance copper powder, copper salts, alkali iodide. Hydroxy-groups may be converted, for example by means of sulfuric acid, chlorosulfonic acid, fuming sulfuric acid into sulfuric acid ester groups, if desired in presence of a solvent, for instance a halogen hydrocarbon, diethyl ether, dichlorodiethylether or another substance having a favorable effect upon the reaction, for instance glacial acetic acid or acetic acid anhydride. Especially suitable for this purpose is the addition product of sulfur trioxide to a tertiary base, for instance pyridine. Phosphoric acid ester groups may be introduced in known manner, for example by means of phosphorus oxychloride. Thiourea residues which in salt form also lend water-solubility may be introduced by treatment of a compound of the general formula $$R_1-X-CH_2-Y-R_2$$

in which either $R_1$ or $R_2$ contains a reactive halogen atom with thiourea, if desired in the presence of a solvent, such as glacial acetic acid, the temperature being 80-100° C. for example. Tertiary amino-groups which are contained in either of the residues $R_1$ or $R_2$ of the last named general formula may be converted into quaternary ammonium groups by addition of halogenalkyl or a neutral sulfuric acid ester.

The products of the present invention may be represented by the formula $$R_1-X-CH_2-Y-R_2-Z$$

wherein $R_1$ represents an organic radical, X and Y stand for a link containing an element of the fifth and sixth group of the periodic system of the elements, the atomic weight of which amounts to at most 32 and is practically an even number, which element directly connects the methylene group $-CH_2-$ with one of the radicals $R_1$ and $R_2$, i. e. a link containing oxygen, nitrogen or sulfur, at least one of the links X and Y representing oxygen, $R_2$ stands for an organic radical containing at least 2 carbon atoms and Z stands for a water-solubilizing group, separated from Y by at least two carbon atoms which products form liquid to solid masses, being decomposed by boiling with water. The above mentioned links may be typified by $-O-$, $-NR_3-$, $R_3$ being hydrogen or a substituted or unsubstituted hydrocarbon radical and $-S-$. These links may be contained in the products of the above indicated general formula $R_1-X-CH_2-Y-R_2-Z$ for instance in the form of the following groups:

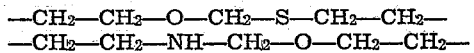

The organic radical $R_1$ may be an aliphatic, cycloaliphatic, aromatic, mixed aliphatic-aromatic or mixed alaphatic-cycloaliphatic hydrocarbon radical, for instance an ethyl, amyl, cyclohexyl, naphthyl, benzyl, hexadecyl-cyclohexyl radical, or a substituted hydrocarbon radical, for instance a chloro amyl radical, or an aliphatic, cycloaliphatic, aromatic, mixed aliphatic aromatic acyl radical, for instance a valeric, stearic, hexahydrobenzoïc radical, or an acyl radical of a naphthenic or resinic acid, or a benzoyl, naphthoyl radical, or an acyl radical of the type

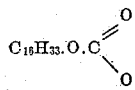

Instead of the above indicated radicals $R_1$ may also represent one of the organic radicals $R_1$ and $R_2$ of the above indicated general formulas $$R_1-X-CH_2-OH \text{ or } H-Y-R_2$$

Many organic radicals have been named in connection with the two last mentioned general formulas. In case at least one of the radicals $R_1$ and $R_2$ stands for an acyl radical the characteristic part of the compounds of the formula $$R_1-X-CH_2-Y-R_2-Z$$

may be represented for instance by

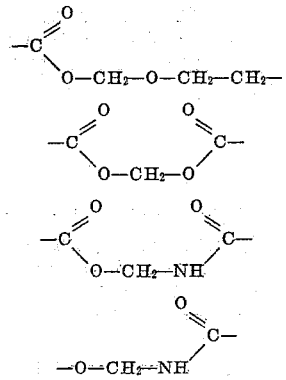

The organic radical $R_2$ in the above indicated formula may have the same signification as $R_1$; but $R_2$ may also be represented by a lower aliphatic hydrocarbon or acyl radical containing less than 5 carbon atoms, for instance by an ethyl, propyl, isopropyl, butyl, isobutyl, acetyl, chloroacetyl radical or by a propionic acid, chloropropionic acid, butyric acid radical. The radicals of the aliphatic and cycloaliphatic series, in contradistinction to aromatic radicals, do not contain conjugated double bonds and may therefore be designated as radicals free from conjugated double bonds.

Examples of products of the above general formula

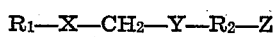

are:

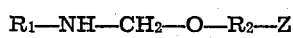

wherein

R₁=an acyl of a naphthenic acid,
R₂=acyl of the aliphatic series such as

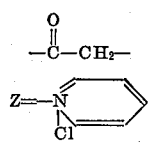

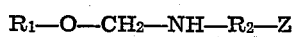

wherein

R₁=an acyl of a naphthenic acid,
R₂=acyl of the aliphatic series, such as

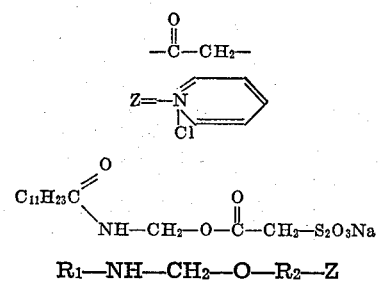

wherein R₁ and R₂ stand for radicals of higher fatty acids, such as stearic or oleic acid, and Z stands for

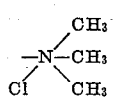

Instead of the above indicated formula

the general formula

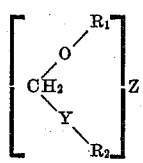

wherein R₁, R₂, Y and Z have the above indicated signification and wherein the water-solubilizing group Z is connected with one of the radicals R₁ and R₂ and separated from one of the links O and Y by at least 2 carbon atoms, may be used to represent the products of the present invention.

The products of the invention are useful as auxiliary agents, for example in the textile, leather and paper industries. Owing to their capillary active properties those products which contain an aliphatic or cycloaliphatic residue of high molecular weight are valuable agents for wetting, emulsifying, foam-production and levelling. Their especial interest lies in their property of yielding water-soluble salts which may be decomposed by heating or treatment with a saponifying agent, whereby an insoluble body is precipitated. If this decomposition occurs on a substratum, for instance on a textile, this insoluble body is precipitated in an adhering form. According to its nature it may impart certain valuable properties to the fibre. Among these may be mentioned waterproof or water-repellent character fast to washing, in many cases united with special softness and fullness, which latter may be enhanced by the addition of a suitable filling agent. There may also be obtained a strong diminution of hygroscopic character and an increase of heat insulation and electrical insulation. As further properties which may be imparted to the fibre there may be mentioned stability to creasing and to the slip of the threads of the fabrics over each other, the diminution of the lustre, the increased stability to water, the diminution of the shrinking of the fabric, and, in the case of wool, prevention of felting. By local application of the process calendering, matting, and damask effects and colored effects which are due to the changed affinity of the fibre for dyestuffs are obtainable. When the process is applied to colored textiles the properties of the dyeings, for instance fastness to light, to friction, to washing and to water are essentially increased. These various effects may be additive.

If the parent materials selected for the condensation are dyestuffs or intermediate products for making dyestuffs it is possible to apply the new products to the fibre and then subject them to decomposition, whereby the dyestuffs or the intermediate products are fixed on the fibre, whereupon the intermediate products may be developed to dyestuffs if desired.

The products of the invention may be used alone or together with other substances, such as salts, especially those of feeble acids, for instance sodium acetate, or together with solvents, soaps, soap-like substances, protective colloids, dressing agents, loading agents, softening agents or wetting agents.

The following examples illustrate the invention, the parts being by weight; the relationship between the parts by volume and the parts by weight is that of the liter to the kilo:

*Example 1*

23 parts of lauric acid methylolamide are dissolved in 100 volumes of pyridine. While stirring there are introduced in small portions at 60–70° C. 27 parts of benzoic acid sulfochloride of the formula

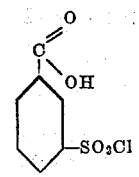

After stirring for one hour at the temperature named a sample of the mass will be found to be clearly soluble in water. The pyridine is then distilled in a vacuum, the product being left as a fatty mass corresponding probably in the free state to the formula

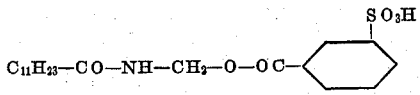

which is soluble in moderately warm, feebly acidified water with the formation of a strong foam, but to a clear solution. The following reaction has probably taken place:

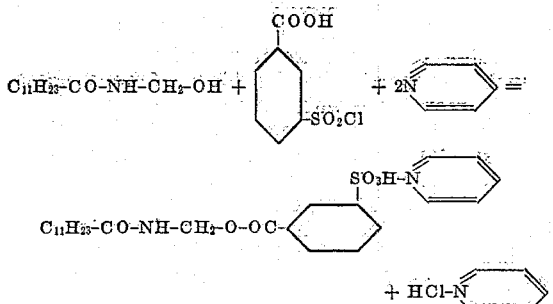

On boiling this aqueous solution the product is decomposed after a short time, forming an insoluble oil; on addition of a weak alkali the compound is instantly decomposed, especially when warm with formation of an insoluble product. Instead of N-hydroxymethyl lauric acid amide the N-hydroxymethyl naphthoic acid amide may be used.

*Example 2*

14 parts of stearic acid methylolamide dissolved in 50 parts by volume of pyridine and while stirring at 70–80° C. 13 parts of benzoic acid sulfochloride are introduced. After stirring for an hour at the temperature named, the product is soluble in hot feebly acidified water with formation of a strongly foaming solution. The new products correspond very probably in the free state with the following formula

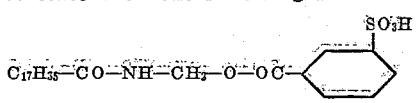

Thus the following reaction has probably taken place:

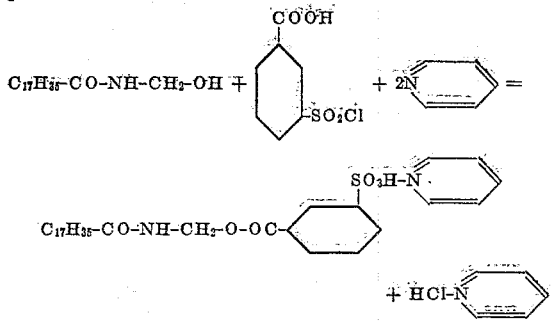

The mass is worked up as described in Example 1, whereby a fatty mass is also produced having the same properties as those of the product of Example 1. The application of this new product for improving the textiles may be described as follows:

20 parts of the product are dissolved in a solution consisting of 10 parts of formic acid and 190 parts of water at 50–60° C., whereby a slightly milky solution is obtained. This solution is added to a mixture consisting of 1000 parts of water and 10 parts of formic acid at 50–60° C., whereby a strongly foaming feebly opalescent liquor is produced.

(a) 100 parts of cotton fabric are handled for 5–10 minutes in this liquor and then squeezed and dried at 50–60° C. and then ironed. The fabric is thus made extraordinarily repellent to water and this effect is not diminished by washing.

(b) The fabric treated in the liquor may be wrung out and handled for 1–2 minutes in a solution of sodium carbonate of 1 per cent strength at 60–70° C. and then rinsed and dried; this fabric is also water repellent and has a surprisingly soft feel.

(c) The fabric treated in this liquor and squeezed out is heated for a short time after drying at a moderate temperature above 100° C. whereby again a surprisingly water-repellent and soft material is produced. The liquor may contain a salt, for instance alum, aluminium formate, magnesium sulfate or another filling agent, water repelling agent, dressing agent, for instance starch, paraffin or the like. The treated fabric may be dyed or undyed. The dyeing may be with acid dye, mordant dye, vat dye, direct dye, sulfur dye or pigment dye (ice color etc.). An improvement of the fastness, for example, the fastness to water or washing, or indeed the fastness to light, may be attained.

*Example 3*

14 parts of stearic acid amide are dissolved in 50 parts by volume of pyridine and after addition of 1.7 parts by volume of paraformaldehyde the whole is heated for 2–3 hours at 90–100° C. Into the solution cooled to 60° C. are introduced, while stirring, 14 parts of benzoic acid sulfochloride, the temperature being kept at 70° C. by cooling. After stirring for an hour at 60–70° C., a sample will be found to be clearly soluble with dilute formic acid. After distilling the pyridine in a vacuum at about 70° C. the condensation product remains in the form of a waxy substance having properties of the product described in Example 2. The new product corresponds in the free state very probably with the formula

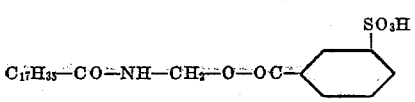

*Example 4*

15 parts of abietic acid amide are dissolved in 50 parts of pyridine, and the solution, after addition of 1.7 parts of paraformaldehyde, is heated for 10 hours at 90–100° C. Into the solution cooled to 60° C. 14 parts of benzoic acid sulfochloride are introduced gradually while stirring and then the whole is further stirred for 1–2 hours at 60–70° C. After distilling the pyridine there is left a water-soluble product which exhibits the same decomposition phenomena as the product of Example 1. The new product corresponds in the free state very probably with the formula

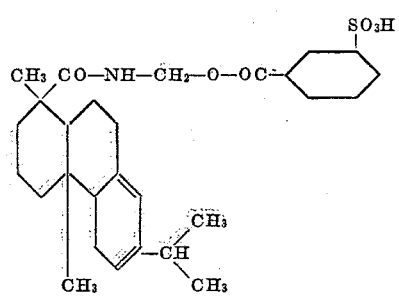

*Example 5*

A commercial mixture consisting chiefly of octadecyl alcohol and a small proportion of hexadecyl alcohol is converted in usual manner in the α-chloromethyl ether. 20 parts of the α-chloromethyl ether thus obtained and of boiling point 183–188° C. under 3 mms. pressure are allowed to flow gradually on to 9.4 parts of finely pulverized potassium chloroacetate contained in a vessel provided with a stirrer, the stirrer being set to work as soon as possible. The temperature of the mixture gradually rises and is advantageously kept below 40° C. After stirring for 4 hours at 30–35° C. and for 3 hours at 35–40° C. there is obtained a nearly quantitative yield of the ester of the chloracetic acid which may be removed from the mass by extraction with a solvent, for instance diethyl ether or benzene; it is thus a colorless solid mass. For converting it into the quaternary pyridinium chloride it is dissolved in an equal weight of pyridine, and the solution is allowed to stand for some days; whereupon the pyridinium compound which is gradually precipitated is separated from the mother liquor and dried at a low temperature. There is obtained a solid mass which dissolves in water at about 40° C. to a solution that foams when shaken.

The pyridinium chloride thus obtained corresponding probably with the formula

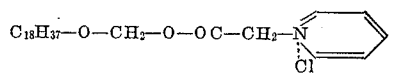

is especially suitable for softening textiles from natural or artificial fibres, for instance cotton, wool, viscose artificial silk. Thus the following reaction has probably taken place:

(a) 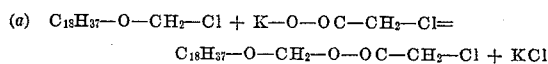

(b) 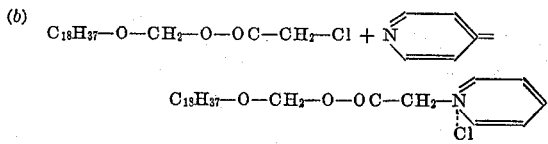

The following process may be recommended for softening fabrics.

A cotton fabric is treated in a liquor ratio of 1:10 for about 15 minutes in a solution at 35° C. containing per litre 20 grams of the above described pyridinium compound. For making the solution the pyridinium chloride is stirred with water heated to 35–40° C. Alternatively, the pyridinium chloride may be dissolved in the necessary quantity of alcohol and diluted with water heated to 35–40° C. The treated fabric is then wrung out and dried at a low temperature, for instance 50° C. The fabric is then soft. When the dry fabric is heated at 130° C. for 5 minutes, the soft feel which it has acquired is not lost on washing. The material is also water-repellent and this property withstands washing.

The solution used for this impregnating process may contain sodium acetate or another alkali salt of a feeble acid in addition to the pyridinium chloride.

For rendering dyeings fast to water the following prescription may be applied:

A cotton fabric dyed with 2 per cent of direct fast Violet 2 RL (Schultz Farbstofftabellen, 7th edition, vol. II, page 88) is impregnated as described above with a solution of 2 per cent strength of the above described pyridinium chloride and then dried at 50° C. When the dyeing is treated with water for 24 hours there is no bleeding, whereas the untreated dyeing bleeds under the same conditions so strongly on to undyed cotton that dyeing of the latter occurs, the effect being nearly as strong as the dyeing which has been treated with water.

With aid of the aforesaid pyridinium chloride the affinity of the fibres of cellulose or cellulose hydrate for acid dyestuffs and direct dyestuffs is increased. If untreated material is dyed at room temperature with 0.5 per cent of the Alizarine Fast Blue BB (Schultz, Farbstofftabellen, 7th edition, vol. II, page 10), the dyestuff is adsorbed only defectively and may be removed from the fibre nearly completely by subsequent rinsing. When, however, the cellulose material has been treated as prescribed above with a solution of 2 per cent strength of the pyridinium chloride and then dried at 50° C., the dyestuff is adsorbed nearly completely and is very well fixed.

*Example 6*

20 parts of stearic acid chloride are gradually added by drops while cooling to a mixture of 7.1 parts N-methylolchloracetamide and 30 parts of dry pyridine. The whole is then stirred for about 18 hours at room temperature and then about 6 hours at 35–40° C. The pyridinium compound thus produced is precipitated by means of ether, separated from the mother liquor and dried at a low temperature. There is obtained a colorless solid mass corresponding very probably with the formula

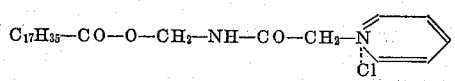

which yields with water a solution that foams when shaken. Thus the following reaction has probably taken place:

(a) 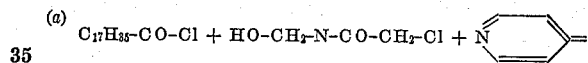

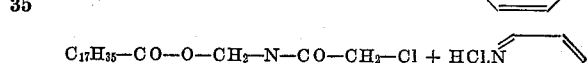

(b) 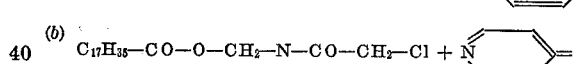

This pyridinium chloride is especially suitable for softening viscose artificial silk, the following procedure being advisable:

De-oiled viscose artificial silk yarn is treated at a liquor ratio of 1:10 for about 15 minutes in a solution at 35° C. containing per litre 0.1–0.4 gram of the pyridinium chloride last described and 0.03–0.12 gram of sodium acetate; the yarn is then centrifuged and dried at 50° C. The material which has thus acquired a soft feel is kept for 30 minutes at 125° C. and then soaped for 30 minutes at 50° C. in a liquor containing 5 grams of soap per litre. The rinsed and dried material has a soft flowing feel.

*Example 7*

A mixture of 90 parts of stearic acid chloromethyl ester from commercial stearic acid and 115 parts of potassium chloroacetate is heated together for about 4 hours while stirring. By extraction with acetone the derivative of methyleneglycol thus formed is removed from the mass. 20 parts of the product obtained by extraction is dissolved in 40 parts by volume of pyridine and the solution is allowed to stand for some days at room temperature. The new quaternary salt precipitates gradually. It is separated from the mother liquor, washed with diethyl ether and freed from adhering solvent. There is obtained a solid colorless mass which dissolves in hot water to a solution that foams when shaken; it is probably a mixture of

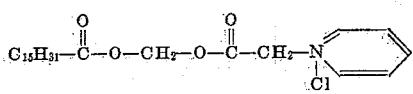

and

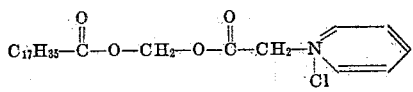

The new salt may be used for example for making textiles repellent to water and fast to washing.

The stearic acid chloromethyl ester may be made in the usual manner from commercial stearic acid chloride by means of paraformaldehyde in presence of zinc chloride.

*Example 8*

9.5 parts of the condensation product of the probable formula

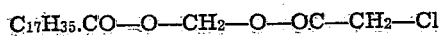

described in Example 7 and purified by extraction are added to a solution of 90° C. of 2.5 parts of thiourea in 60 parts of glacial acetic acid and the temperature is kept for 2 hours at 88–92° C. After cooling the precipitated condensation product is separated from the mother liquor, washed with glacial acetic acid and dried. There is obtained a colorless solid mass which dissolves in water to a solution which foams when shaken. Thus the following reaction has probably taken place:

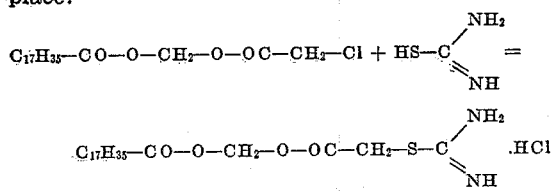

*Example 9*

15 parts of the ester of chloroacetic acid, obtained as described in Example 5 from potassium chloroacetate, and the chloromethyl ether from a mixture of alcohols of high molecular weight, 13 parts of anhydrous sodium thiosulfate and 150 parts by volume of methanol are mixed together and the mixture is stirred at 35–40° C. for a short time. 15 parts by volume of water are then added and stirring is continued for about 2–3 hours at the aforesaid temperature. The whole is then allowed to settle at 35–40° C. without stirring, the methyl alcoholic solution is decanted from the undissolved particles and the solution is evaporated to dryness at room temperature under diminished pressure. The product thus obtained is a colorless solid mass soluble in water to a solution that foams when shaken. The thiosulfate described above is suitable, for example, for waterproofing textiles from natural or artificial fibres, for instance cotton, wool, artificial viscose silk, the following procedure being recommended:

Cotton fabric is treated at a liquor ratio of 1:10 for about 15 minutes in a solution of 35° C. containing per litre 10 grams of the product above described and 4.4 grams of crystallized sodium acetate. For producing the solution the materials may be stirred with water heated to 35–40° C. Instead the materials may be dissolved in the necessary quantity of alcohol and the solution diluted with water heated to 35–40° C. The treated fabric is wrung out and dried at a low temperature for instance 50° C. or ironed directly. The fabric thus treated is soft. If the dried fabric is heated for 3 minutes at 120° C. it becomes water-repellent and the dressing effects thus attained are not affected by washing.

*Example 10*

5.4 parts of a commercial mixture consisting chiefly of octadecyl alcohol and a small proportion of hexadecyl alcohol are heated together with 10 parts of chloromethyl-β-chlorethyl ether for 4 hours while stirring at 90–100° C. After this time the evolution of hydrochloric acid has ceased. The excess of ether is then distilled in a vacuum and the residue heated on the steam bath for 10 minutes with 5 parts by volume of pyridine. After distilling the excess of pyridine there remains as the product of reaction a mixture of

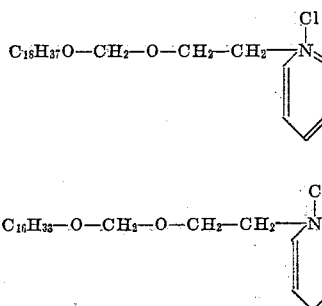

and in the form of a semi-solid mass soluble in water with production of foam. The aqueous solution decomposes gradually when boiled.

*Example 11*

12 parts of stearic acid-N-methylamide are heated together with 20 parts of chloromethyl-β-chloroethyl ether while stirring at 90–100° C. until the evolution of hydrochloric acid has ceased. After 3 hours the reaction is complete. The excess of ether is distilled in a vacuum, the condensation product remaining in the form of a semi-solid mass. To the cooled product 10 parts by volume of pyridine are added and the mixture is heated on the steam bath until a sample dissolves clearly in water. The reaction occupies 20 minutes. The excess of pyridine is distilled in a vacuum.

The product may be suppposted to the have the formula

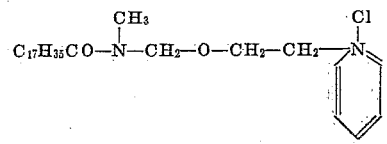

It is a semi-solid mass soluble in water to a solution which foams. When the aqueous solution is boiled decomposition gradually occurs. Thus the following reaction has probably taken place:

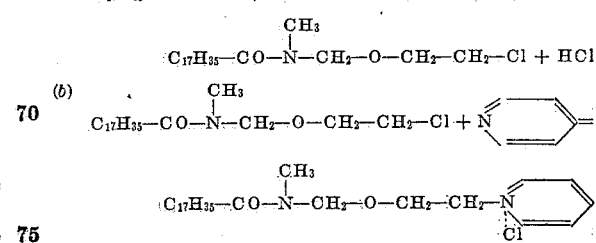

Example 12

1 part of lauryl mercaptan is heated together with 0.7 part of chloromethyl-β-chlorethyl ether for about ½ hour at 80–85° C. and then for about 4 hours at 80–85° C. The product crystallises on cooling to a colorless crystalline mass; it is dissolved in 5 parts by volume of pyridine and the solution is allowed to stand at room temperature for about 24 hours. On addition of petroleum ether the new quaternary salt, which probably has the formula

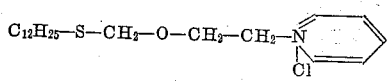

is precipitated. There is obtained a solid colorless mass which is clearly soluble in water, the solution foaming strongly when shaken. Thus the following reaction has probably taken place:

(a) $C_{12}H_{25}-SH + Cl-CH_2-O-CH_2-CH_2-Cl =$
$C_{12}H_{25}-S-CH_2-O-CH_2-CH_2-Cl + HCl$ (b) 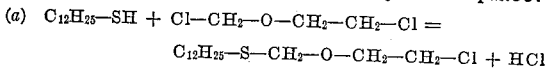

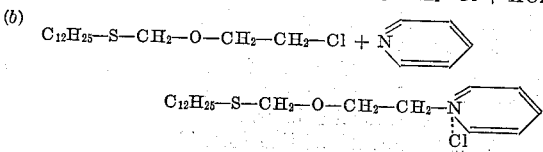

Example 13

1.7 parts of the ester obtainable in the usual manner from thioglycollic acid and the commercial mixture consisting mainly of octadecyl alcohol and a small proportion of hexadecyl alcohol is heated gradually with 0.6 part of chloromethyl-β-chlorethyl ether at 95–100° C. and the mass is kept for about 5 hours at this temperature. After cooling 2 parts by volume of pyridine are added and the whole is allowed to stand for 24 hours at room temperature and then precipitated by addition of petroleum ether. The new quaternary pyridinium salt is a colorless solid mass soluble in water to a solution which foams and probably consisting of a mixture of

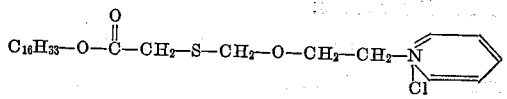

and

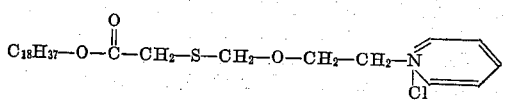

Example 14

23 parts of lauric acid methylolamide are dissolved in 100 parts of dry pyridine, whereupon 20 parts of para-chloromethylbenzoylchloride are allowed to flow to the solution at 60–70° C. The mass is stirred at water-bath temperature, whereupon it turns turbid after a short time and an oily precipitation sets in. When the reaction is complete the remaining pyridine is removed and the reaction product which is oily at a raised temperature is liberated in a vacuum from the adhering pyridine. There results a fatty mass which dissolves in acidified water with formation of strongly foaming solutions, and which solutions precipitate an insoluble product on addition of dilute alkalies in the heat.

What we claim is:

1. A product of the formula

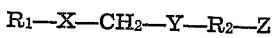

wherein $R_1$ represents a radical containing more than 8 carbon atoms and selected from the group consisting of aliphatic, aliphatic-aromatic and cycloaliphatic radicals, each of X and Y stands for a member selected from the group consisting of O and S, at least one of the links X and Y representing oxygen, $R_2$ stands for an acyl radical of a carboxylic acid containing at least two carbon atoms, and Z stands for a member selected from the group consisting of quaternary aliphatic ammonium groups, quaternary heterocyclic ammonium groups, and isothiourea radicals in salt form, separated from Y by at least two carbon atoms.

2. A product of the formula

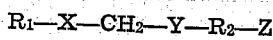

wherein $R_1$ represents an aliphatic radical containing more than 8 carbon atoms each of X and Y stands for a member selected from the group consisting of O and S, at least one of the links X and Y representing oxygen, $R_2$ stands for an acyl radical of a carboxylic acid containing at least two carbon atoms, and Z stands for a member selected from the group consisting of quaternary aliphatic ammonium groups, quaternary heterocyclic ammonium groups, and isothiourea radicals in salt form, separated from Y by at least two carbon atoms.

3. The product of the formula

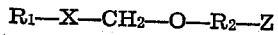

wherein $R_1$ represents an aliphatic radical containing more than 8 carbon atoms X stands for a member selected from the group consisting of O and S, $R_2$ stands for an acyl radical of a carboxylic acid containing at least two carbon atoms, and Z stands for a member selected from the group consisting of quaternary aliphatic ammonium groups, quaternary heterocyclic ammonium groups, and isothiourea radicals in salt form, separated from O by at least two carbon atoms.

4. The product of the formula

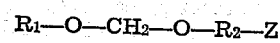

wherein $R_1$ represents an aliphatic acyl radical containing more than 8 carbon atoms, $R_2$ stands for an acyl radical of a carboxylic acid containing at least two carbon atoms, and Z stands for a member selected from the group consisting of quaternary aliphatic ammonium groups, quaternary heterocyclic ammonium groups, and isothiourea radicals in salt form, separated from the adjacent O by at least two carbon atoms.

5. The process of preparing water soluble esters which comprises reacting an ester-like constituted compound having the formula

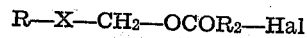

wherein R stands for an aliphatic radical of at least 12 carbon atoms, X stands for a member selected from the group consisting of O and S, $R_2$ stands for a low molecular aliphatic hydrocarbon radical, and Hal means halogen, with a member of the group consisting of tertiary aliphatic amines, tertiary heterocyclic amines, and thioureas capable of reacting in the isoform.

6. The process of preparing water soluble esters which comprises reacting an ester-like constituted compound having the formula

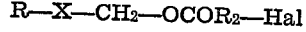

wherein R stands for an aliphatic hydrocarbon radical of at least 12 carbon atoms, X stands for a member selected from the group consisting of O and S, $R_2$ stands for a low molecular aliphatic hydrocarbon radical, and Hal means halogen, with a member of the group consisting of tertiary aliphatic amines, tertiary heterocyclic amines, and thioureas capable of reacting in the isoform.

7. The process of preparing water soluble esters which comprises reacting an ester-like constituted compound having the formula

$$R_1-O-CH_2-OCOR_2-Hal$$

wherein $R_1$ stands for an aliphatic hydrocarbon radical of at least 12 carbon atoms, $R_2$ stands for a low molecular aliphatic hydrocarbon radical, and Hal means halogen, with a member of the group consisting of tertiary aliphatic amines, tertiary heterocyclic amines, and thioureas capable of reacting in the isoform.

8. The manufacture of a compound having in the free state the formula

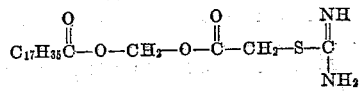

which comprises reacting stearic acid chloromethyl ester with a salt of an alkali metal the atomic weight of which amounts to at most 40 with chloroacetic acid, and treating the reaction product with thio-urea.

9. A product having in the free state the formula

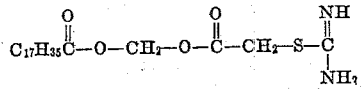

which products forms a fatty mass the aqueous solution of which decomposes on boiling to form an insoluble compound.

10. The manufacture of the compound of the formula

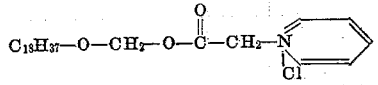

which comprises reacting octadecyl chloromethyl ether with a salt of an alkali metal the atom weight of which amounts to at most 40 with chloroacetic acid, and treating the reaction product with pyridine.

11. The product of the formula

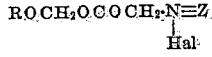
$$R.O.CH_2.OCO.CH_2.N\equiv Z$$
$$|$$
$$Hal$$

wherein R is an aliphatic hydrocarbon radical of at least 12 carbon atoms, $N\equiv Z$ is the radical of a tertiary aliphatic base, and Hal is halogen.

12. The product of the formula

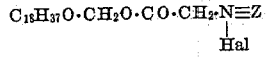
$$C_{18}H_{37}O.CH_2.O.CO.CH_2.N\equiv Z$$
$$|$$
$$Hal$$

wherein $N\equiv Z$ is the radical of a tertiary aliphatic base, and Hal is halogen.

13. A process of preparing quaternary ammonium salts which comprises reacting an ester-like constituted compound having the formula $$R.O.CH_2.OCO.R_2.Hal$$

wherein R stands for an aliphatic radical of at least 12 carbon atoms, $R_2$ stands for a low molecular aliphatic hydrocarbon radical, and Hal means halogen, with a tertiary heterocyclic base.

14. The process which comprises reacting the compound of the formula $$C_{18}H_{37}.O.CH_2.OCO.CH_2Cl$$

with pyridine.

15. The product of the formula

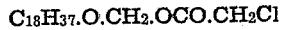

16. A quaternary ammonium salt of the formula

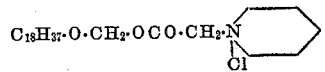
$$R.O.CH_2.OCO.R_2.N\equiv Z$$
$$|$$
$$Hal$$

wherein R stands for an aliphatic radical of at least 12 carbon atoms, $R_2$ stands for a low molecular aliphatic hydrocarbon radical, Hal means halogen, and $N\equiv Z$ stands for the radical of a tertiary heterocyclic base.

17. The product of the formula

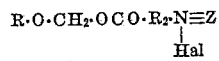
$$R.O.CH_2.OCO.CH_2.N\equiv Z$$
$$|$$
$$Cl$$

wherein R stands for an aliphatic radical of at least 12 carbon atoms, and $N\equiv Z$ stands for the radical of a tertiary heterocyclic base.

18. The process which comprises reacting octadecyl-chloromethyl ether with an alkali metal chloracetate and pyridine.

CHARLES GRAENACHER.
RICHARD SALLMANN.
OTTO ALBRECHT.

REFERENCES CITED

The following references are of record in the file of this patent:

UNITED STATES PATENTS

| Number | Name | Date |
|---|---|---|
| 1,917,250 | Harris | July 11, 1933 |
| 2,022,678 | Kritchevsky | Dec. 3, 1935 |
| 2,023,075 | Harris | Dec. 3, 1935 |
| 2,075,013 | Baldwin | Mar. 30, 1937 |
| 2,089,250 | Graenacher et al. | Aug. 10, 1937 |

FOREIGN PATENTS

| Number | Country | Date |
|---|---|---|
| 471,048 | Great Britain | Aug. 23, 1937 |
| 819,945 | France | Oct. 28, 1937 |

OTHER REFERENCES

Beilstein-Band, 1935, pp. 223 and 224.